US009587554B2

(12) United States Patent
Hoshi et al.

(10) Patent No.: US 9,587,554 B2
(45) Date of Patent: Mar. 7, 2017

(54) TWIN-SCROLL TURBOCHARGER

(71) Applicant: MITSUBISHI HEAVY INDUSTRIES, LTD., Tokyo (JP)

(72) Inventors: Toru Hoshi, Tokyo (JP); Takao Yokoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 325 days.

(21) Appl. No.: 14/368,883

(22) PCT Filed: Nov. 14, 2012

(86) PCT No.: PCT/JP2012/079505
§ 371 (c)(1),
(2) Date: Jun. 26, 2014

(87) PCT Pub. No.: WO2013/099461
PCT Pub. Date: Jul. 4, 2013

(65) Prior Publication Data
US 2014/0356153 A1   Dec. 4, 2014

(30) Foreign Application Priority Data

Dec. 28, 2011   (JP) ................. 2011-288837

(51) Int. Cl.
*F01D 9/02*   (2006.01)
*F02B 37/02*   (2006.01)
*F01N 13/10*   (2010.01)

(52) U.S. Cl.
CPC ............ *F02B 37/025* (2013.01); *F01D 9/026* (2013.01); *F01N 13/107* (2013.01); *F05D 2220/40* (2013.01); *Y02T 10/144* (2013.01)

(58) Field of Classification Search
CPC ................ F01N 13/107; F01D 9/026
See application file for complete search history.

(56) References Cited

U.S. PATENT DOCUMENTS 4,512,716 A * 4/1985 McHenry ................ F01D 9/026
  415/205
4,544,326 A 10/1985 Nishiguchi et al.
(Continued)

FOREIGN PATENT DOCUMENTS

CN     103038479 A    4/2013
JP     59-122726 A    7/1984
(Continued)

OTHER PUBLICATIONS

International Preliminary Report on Patentability and Written Opinion of the International Searching Authority(Forms PCT/IB/338, PCT/IB/373, PCT/ISA/237 and PCT/IB/326) for International Application No. PCT/JP2012/079505, dated Jul. 10, 2014, with an English translation.

(Continued)

*Primary Examiner* — John K Fristoe, Jr.
*Assistant Examiner* — Woody Lee, Jr.
(74) *Attorney, Agent, or Firm* — Birch, Stewart, Kolasch & Birch, LLP (57) ABSTRACT

A twin-scroll turbocharger comprises front and rear scrolls, a scroll throat portion separating the scrolls, a rotor blade rotated by exhaust gas, and a turbine housing forming, with an outer circumferential portion of the rotor blade, the front scroll and the rear scroll, and including an inclined surface on which an extended line of the incline facing toward the scroll throat portion of the front scroll and an inlet of the rotor blade intersect at a position in a central portion of the inlet of the rotor blade, wherein the connection R at a crossing portion P where the inclined surface and an inner periphery surface of the turbine housing intersect has a shape such that the gap of a constant width a continues to the position of the inlet of the rotor blade.

4 Claims, 5 Drawing Sheets

(56) References Cited

U.S. PATENT DOCUMENTS

| | | | |
|---|---|---|---|
| 4,776,168 A * | 10/1988 | Woollenweber | F01D 17/141 60/602 |
| 5,046,317 A | 9/1991 | Satokawa | |
| 2009/0028694 A1 | 1/2009 | Naemura et al. | |
| 2011/0099998 A1 * | 5/2011 | Serres | F01D 17/105 60/602 |
| 2012/0099965 A1 * | 4/2012 | Ramb | F01D 17/105 415/145 |
| 2013/0108429 A1 * | 5/2013 | Sung | F01D 9/026 415/205 |
| 2013/0121820 A1 | 5/2013 | Yoshida et al. | |

FOREIGN PATENT DOCUMENTS

| | | |
|---|---|---|
| JP | 2-83304 U | 6/1990 |
| JP | 3-5936 U | 1/1991 |
| JP | 4-246237 A | 9/1992 |
| JP | 5-272346 A | 10/1993 |
| JP | 2006-348894 A | 12/2006 |
| JP | 2008-215083 A | 9/2008 |
| JP | 2012-97699 A | 5/2012 |
| WO | WO 2008/047943 A1 | 4/2008 |
| WO | WO 2011/002732 A2 | 1/2011 |

OTHER PUBLICATIONS

International Search Report and Written Opinion of the International Searching Authority (Forms PCT/ISA/220, PCT/ISA/210 and PCT/ISA/237) for International Application No. PCT/JP2012/079505, dated Feb. 12, 2013.

Extended European Search Report effective Jul. 7, 2015 issued in corresponding EP Application No. 12863200.7.

Decision to Grant a Patent effective Mar. 15, 2016 issued in corresponding Japanese Application No. 2011-288837 with an English Translation.

Notice of Allowance effective Apr. 18, 2016 issued to the corresponding Chinese Application No. 201280064458.2 with English Translation.

Chinese Office Action effective Oct. 29, 2015 issued in the corresponding Chinese Applicatin No. 201280044582 with an English Translation.

* cited by examiner

TWIN-SCROLL TURBOCHARGER

TECHNICAL FIELD

The present invention relates to a twin-scroll turbocharger configured to be driven by exhaust gas of an engine, having two exhaust gas introducing passages in a turbine housing of the turbocharger.

BACKGROUND

Exhaust gas turbochargers are widely used to compress supply air to an engine by exhaust gas of the engine to improve the output of the engine.

In a case of a common turbocharger (having one exhaust gas introducing passage), the supply air is likely to be insufficiently compressed in a low-speed rotation region of the engine, and as a countermeasure, twin-scroll turbochargers are employed.

A twin-scroll turbocharger has two separated exhaust gas introducing passages to a leading edge of a rotor blade in the turbine housing, one on the front side and the other is on the rear side.

Since such a twin-scroll turbocharger is capable of utilizing dynamic pressure of exhaust pulse of an engine, it has better performance than a usual turbocharger also in a low-speed rotation region of an engine.

In order to effectively utilize dynamic pressure of exhaust pulse of an engine, in a case of a four-cylinder engine, taking the order of the cylinders into consideration, exhaust pipes of the first cylinder and of the fourth cylinder are coupled to introduce exhaust gas into the rear scroll, and exhaust pipes of the second cylinder and the third cylinder are coupled to introduce exhaust gas into the front scroll, and the turbocharger is configured so that exhaust gas is introduced alternately into the front scroll and the rear scroll, and intermittently during two cycles of the engine.

However, when the flow from the front scroll and the flow from the rear scroll are switched, there is a period of time in which the flows from the both scrolls are introduced into the rotor blade, and thus the inlet of the rotor blade has a shape which is suitable for such a state. That is, because exhaust gas is introduced from the both scrolls into the rotor blade, the inlet of the rotor blade has an enlarged width (flow passage area).

Therefore, in the vicinity of the inlet of the rotor blade, exhaust gas blown from the outlet of the rear scroll is rapidly expanded, and the flow of the exhaust gas becomes turbulent, and such turbulent flow may generate swirling flow when it flows between fins of the rotor blade, whereby the flow resistance may be increased and the rotating force of the rotor blade is reduced, which may leads to a problem of reduction in efficiency of the turbocharger.

Prior art of the above feature includes the disclosure of JP H2-83304 U (Patent Document 1).

Patent Document 1 discloses a technique where a partition (scroll throat) separating a front scroll and a rear scroll has a guide plate thereon to adjust the direction of a flow of exhaust gas flowing in the vicinity of the partition.

By this guide plate, the flow angle of the exhaust gas is forced to change to improve the rotating force, thereby to improve turbocharging efficiency of the turbocharger.

CITATION LIST

Patent Literature

Patent Document 1: JP H2-83304 U

SUMMARY

Technical Problem

According to Patent Document 1, a partition separating a front scroll and a rear scroll has a guide plate thereon to adjust the direction of a flow of exhaust gas flowing in the vicinity of the partition. However, by providing such a guide plate, time required to produce a turbocharger may be increased, or cost may be increased due to e.g. a complicated shape of a mold to produce the turbocharger.

The present invention has been made in view of the above problems and is to provide a turbocharger capable of improving turbocharging efficiency and reducing cost by preventing exhaust gas blown from an outlet of a scroll from rapidly expanding in the vicinity of an inlet of a rotor blade to suppress a flow resistance in the rotor blade.

Solution to Problem

In order to accomplish such an object, the present invention provides a twin-scroll turbocharger configured to be driven by exhaust gas of an engine, comprising:
  a turbine housing of a turbocharger,
  two exhaust gas introducing passages comprising a front scroll and a rear scroll, each of which is formed in the turbine housing along an axis line of a rotatable shaft of the turbocharger,
  a separation wall configured to separate the rear scroll and the front scroll, and
  a rotor blade mounted to the rotatable shaft and configured to rotate the rotatable shaft by exhaust gas, wherein
  the rear scroll is disposed so that a center line on a cross-sectional surface along a radial direction is substantially perpendicular to the axis line,
  the front scroll is disposed so that a center line on a cross-sectional surface along a radial direction has a gradient toward a side of an outlet of the rotor blade with respect to the axis line,
  an extended line of an inclined surface of the front scroll on a side of the housing and an inlet of the rotor blade intersect at a position in a central portion of the inlet of the rotor blade, and
  the front scroll has an outlet portion formed so that a crossing portion at which the inner periphery surface of the turbine housing, having a gap of a constant width between the inner periphery surface and an outer circumferential portion of the rotor blade, and the extended line of the inclined surface intersect is at a position within a width of the inlet of the rotor blade and outer along the radial direction than the inlet of the rotor blade.

According to such an invention, the space between the outlet of the scroll and the inlet of the rotor blade is smaller than the width of the inlet of the rotor blade, whereby it is possible to suppress a rapid expansion of the exhaust gas from the rear scroll when it comes through from outlet of the scroll to the inlet of the rotor blade to suppress turbulence of a flow when the exhaust gas passes through the rotor blade, thereby to improve the turbocharging efficiency of the twin-scroll turbocharger.

In the present invention, it may be such that an area of a flow path in an inlet portion of the rotor blade is expanded relative to an area of an outlet of one of the rear scroll or the front scroll, and an area of the outlet of the rotor blade is expanded relative to the area of the flow path in the inlet portion of the rotor blade; and an area expansion rate of the area of the flow path in the inlet portion of the rotor blade to the area of an outlet of one of the rear scroll or the front scroll and an area expansion rate of the area of the outlet of the rotor blade to the area of the flow path in the inlet portion of the rotor blade are substantially the same.

By employing such a structure, the area expansion rate of the area of the flow path in the inlet portion of the rotor blade to the area of an outlet of one of the rear scroll or the front scroll and an area expansion rate of the area of the outlet of the rotor blade to the area of the flow path in the inlet portion of the rotor blade are substantially the same, and thus rapid expansion of the flowing exhaust gas will not arise, whereby it is possible to suppress a turbulent flow of the exhaust gas and the flow resistance, hereby to improve the performance of the turbocharger.

In the present invention, it may be such that a ratio of a width, in an axial direction, of the flow path in the inlet portion of the rotor blade to a width of the outlet of one of the rear scroll or the front scroll is from 1.2 to 1.4.

By employing such a structure, the ratio of a width, in an axial direction, of the flow path in the inlet portion of the rotor blade to the width of the outlet of one of the rear scroll or the front scroll is from 1.2 to 1.4, whereby it is possible to suppress increase in the flow rate of the exhaust gas from the outlet of the scroll to the inlet of the rotor blade to prevent rapid expansion within the rotor blade and a turbulent flow of the exhaust gas within the rotor blade, thereby to improve the efficiency of the turbocharger.

In the present invention, it may be such that the crossing portion is formed in an arc-like shape, and the center of the arc-like shape is, in the radial direction, on the same position as the inlet of the rotor blade or on a position farther than the inlet of the rotor blade from the axis line of the rotatable shaft.

By employing such a structure, the center of the connection R is, in the radial direction, on the same position as the outer circumferential end edge of the rotor blade or on a position farther than the outer circumferential end edge from the axis line of the rotatable shaft, whereby it is possible to permit the width of the gap between the rotor blade and the housing to be the same to the outer circumferential end edge of the rotor blade and to prevent expansion of the exhaust gas at the inlet of the rotor blade, thereby to improve the efficiency of the turbocharger.

Advantageous Effects

According to the present invention, by the reduced width of the inlet of the rotor blade, it is possible to suppress rapid expansion of the exhaust gas from the rear scroll within an area between the outlet of the scroll and the inlet of the rotor blade to suppress turbulence of a flow of the exhaust gas during passing through the rotor blade, thereby to improve the turbocharging efficiency of the twin-scroll turbocharger.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
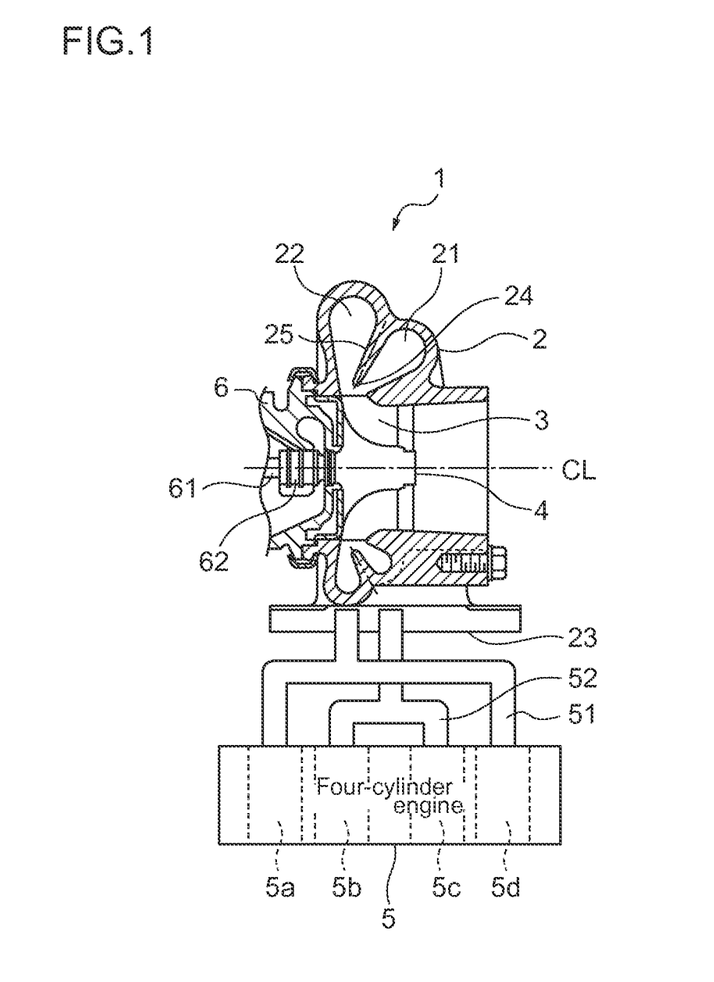
FIG. 1 is a schematic diagram illustrating a twin-scroll turbocharger according to an embodiment of the present invention.

FIG. 1 is a schematic diagram illustrating a twin-scroll turbocharger according to an embodiment of the present invention, and it is a cross-sectional view on the side of an exhaust gas turbine 4 of a twin-scroll turbocharger 1. Four-cylinder engine 5 (cylinders are not shown) has a first cylinder 5a, a second cylinder 5b, a third cylinder 5c and a fourth cylinder 5d, in order from the left in FIG. 1. In regard to exhaust gas exhausted from the engine 5, exhaust gas from the first cylinder 5a and exhaust gas from the fourth cylinder 5d are introduced into an exhaust manifold A 51 and gathered therein, and exhaust gas from the second cylinder 5b and exhaust gas from the third cylinder 5c are introduced into an exhaust manifold B 52 and gathered therein, separately.

The twin-scroll turbocharger 1 comprises an exhaust gas turbine 4, a rotor blade 3 disposed around the exhaust gas turbine 4, which is configured to receive a pressure of the exhaust gas, a shaft 61 which is formed integrally with the exhaust gas turbine 4, a bearing housing 6 by which the shaft 61 is supported via a bearing 62, a compressor (not shown) which is mounted to the shaft 61 on the side opposite to the exhaust gas turbine 4, an exhaust gas introducing portion 23, and a scroll portion configured to discharge exhaust gas introduced into the exhaust gas introducing portion 23 into the exhaust gas turbine 4.

The scroll portion is formed in the turbine housing 2 and has two separated exhaust gas flow passages along the axis line of the shaft 61, each formed around the rotor blade 3 of the exhaust gas turbine 4 and having a spiral shape having varying cross-sectional area of the flow path. The scroll portion is configured so that exhaust gas is to be discharged from the inner side of the spiral shape toward the rotor blade 3.

The two exhaust gas flow passages of the scroll portion comprises a front scroll 21 and a rear scroll 22, disposed in order from the side of the exhaust gas turbine 4 along the axis line CL of the shaft 61.

The front scroll 21 and the rear scroll 22 are separated by a separation wall 25.

Figure 3A:
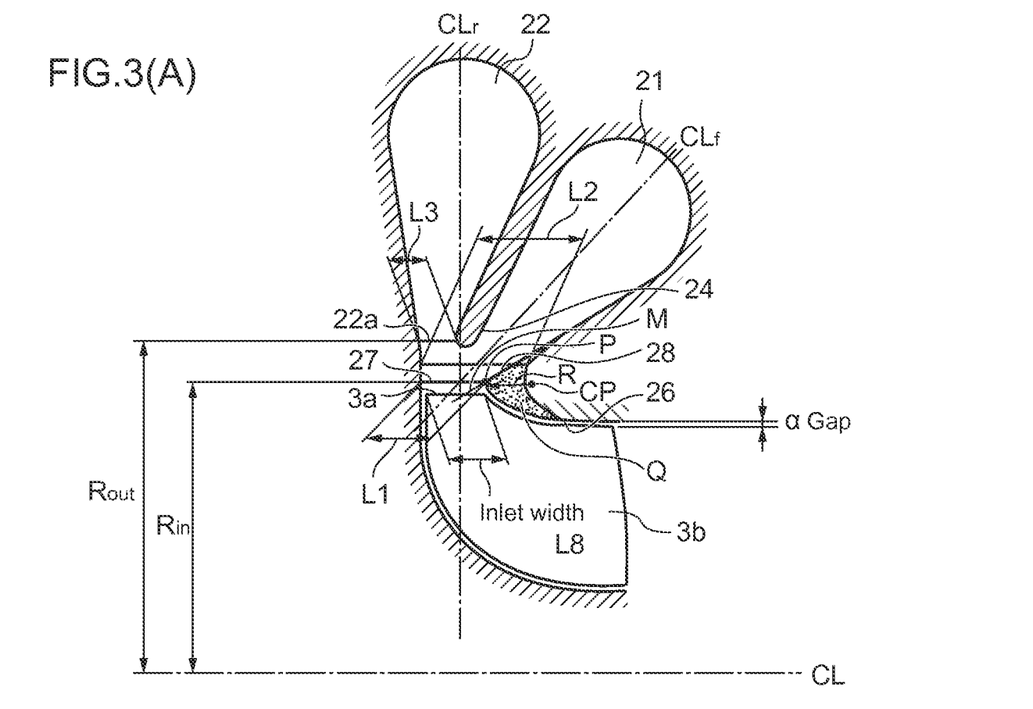
FIG. 3(A) is a view illustrating a shape of a flow path in an inlet portion of the rotor blade according to a first embodiment of the present invention.

The front scroll 21 is disposed so that a center line CLf (see FIG. 3(A)) on a cross-sectional surface of the front scroll 21 along a radial direction has a gradient toward the side of the exhaust gas turbine 4, and the rear scroll 22 is disposed so that a center line CLr (see FIG. 3(A)) on a cross-sectional surface of the rear scroll 22 along a radial direction is substantially perpendicular to the axis line CL.

The exhaust gas introducing portion 23 has two exhaust gas introducing ports, and one of the exhaust gas introducing ports is communicated with the front scroll 21, and the other of the exhaust gas introducing ports is communicated with the rear scroll 22.

Exhaust gas exhausted from the engine 5 is introduced into the front scroll 21 and the rear scroll 22 via the exhaust manifold A 51 and the exhaust manifold B 52, respectively, and is blown toward the rotor blade 3 to cause the exhaust gas turbine 4 to rotate.

Upon rotation of the exhaust gas turbine 4, supply air is pressurized by the compressor (not shown) mounted to the shaft 61 formed integrally with the exhaust gas turbine 4, and then is supplied to the engine 5.

Figure 2A:
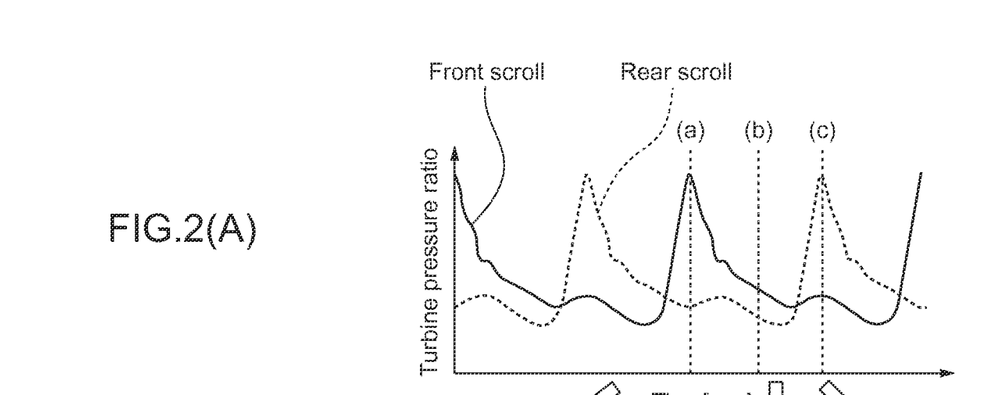
FIG. 2(A) is a chart showing change in pressure acting on the rotor blade by the exhaust gas.
Figure 2B:
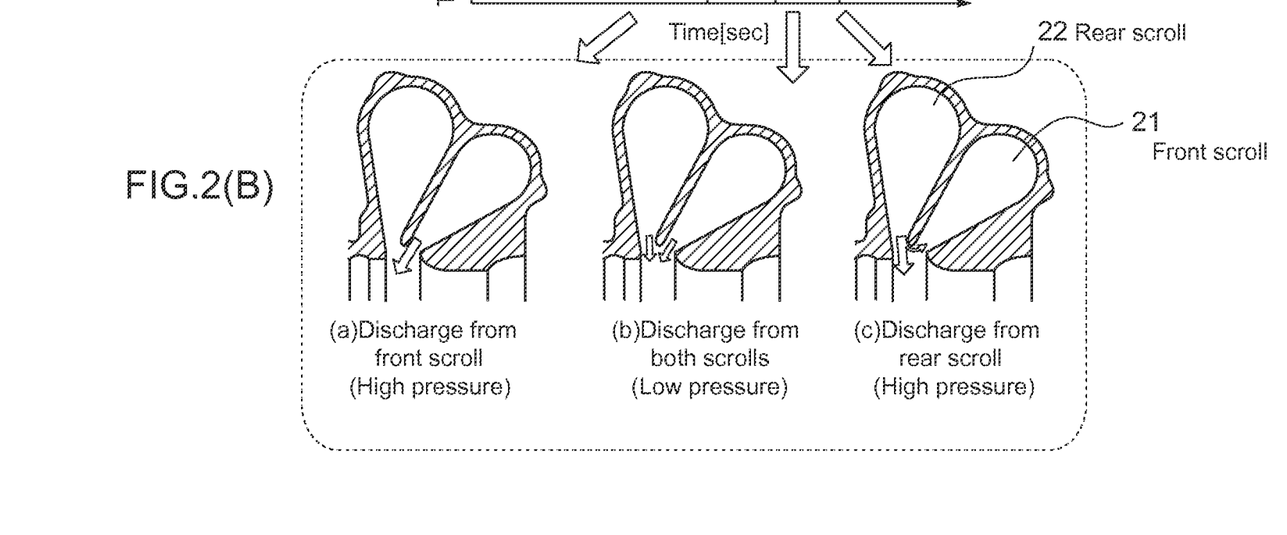
FIG. 2(B) is a schematic diagram illustrating states of discharge of exhaust gas from scrolls corresponding to the pressure change of FIG. 2(A).

FIGS. 2(A) and (B) are charts showing the state of pressure of the exhaust gas exhausted from the four-cylinder (four-cycle) engine 5 from the respective scrolls to the rotor blade 3. In FIG. 2(A), the chart shows a change in the pressure of the exhaust gas introduced from the respective scrolls to the rotor blade 3, and the continuous line represents the state of the front scroll 21, and the dashed line represents the state of the rear scroll 22.

As shown in the figure, the chart of the pressure of the exhaust gas exhausted from the four-cylinder (four-cycle) engine 5 has two peaks representing a high pressure (exhaust pulse) during every two rotations of the engine 5, with respect to each of the front scroll 21 and the rear scroll 22.

FIG. 2(B) is a diagram which schematically illustrates the pressure of the exhaust gas from the front scroll 21 and the rear scroll 22 into the rotor blade 3, and the larger size of the arrow represents the higher pressure.

At the timing of (a), exhaust gas of a pressure corresponding to the peak of the waveform is blown from the front scroll 21 toward the rotor blade 3.

At the timing of (c), exhaust gas of a pressure corresponding to the peak of the waveform is blown from the rear scroll 22 to the rotor blade 3.

The state transits from (a) to (c) via (b), and at the timing of (b), exhaust gas remaining in the exhaust manifold A 51 and the exhaust manifold B 52 is blown with low pressure from the both manifolds 51, 52 to the rotor blade 3.

For the purpose of improving the turbocharging pressure of a twin-scroll turbocharger (as well as a single-scroll turbocharger), it is effective to increase the pressure of the exhaust gas to be blown toward the rotor blade 3 for improving the turbocharging pressure.

Figure 3B:
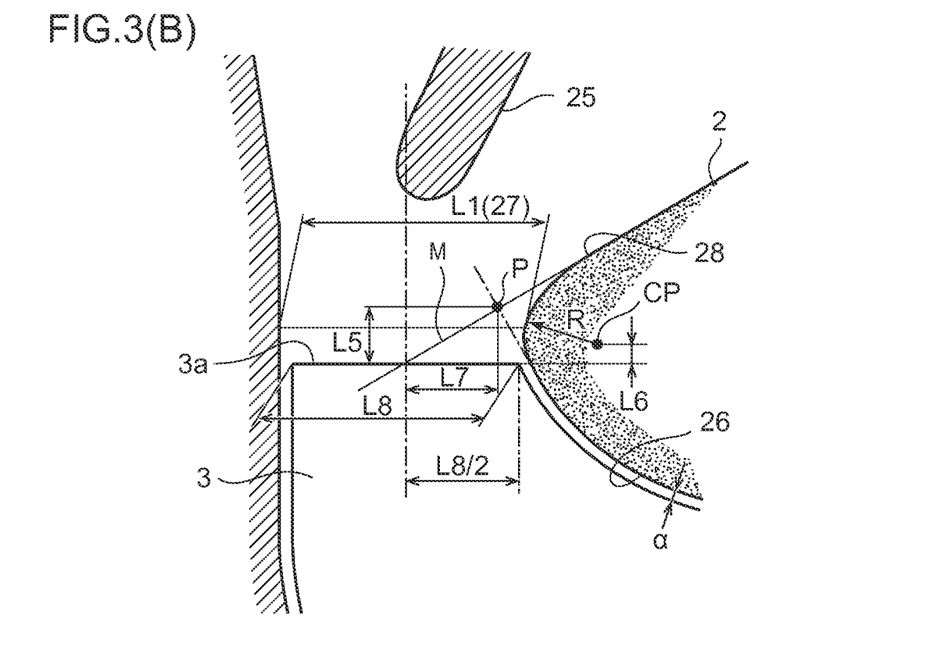
FIG. 3(B) is an enlarged view of the flow path in the inlet portion of the rotor blade.

FIG. 3(A) is a view illustrating a flow path 27 in an inlet portion of the rotor blade having a different shape at the side of the turbine housing 2, and FIG. 3(B) is an enlarged view of the flow path 27 in the inlet portion of the rotor blade.

The connection R having an ark-like shape at a crossing portion P where an inclined surface 28, on which an extended line M of the incline of the surface (turbine housing 2) facing toward the separation wall 25 forming a scroll throat portion 24 of the front scroll 21 and the inlet 3a of the rotor blade (outer circumferential end edge of the rotor blade) intersect at a position in a central portion of the inlet 3a of the rotor blade, i.e. the position of L8/2 (intermediate portion of the inlet 3a of the rotor blade in the direction of the axis line CL), and an inner periphery surface 26 of the turbine housing 2, having a gap α of a constant width between the inner periphery surface 26 and an outer circumferential portion of the rotor blade 3, intersect has a shape such that the gap α continues to the position of the inlet 3a of the rotor blade.

Accordingly, the crossing portion P is at a position of L7, which is closer to position of L8/2 in the central portion of the rotor blade 3 (within the width of the inlet of the rotor blade 3) than the end edge of the gap α, between the rotor blade 3 and the turbine housing 2, on the side of the rotor blade 3.

The crossing portion P is at a position further out the radial direction from the axis line CL of the shaft 61 than the inlet 3a of the rotor blade by a length of L5. That is, the center position CP of the connection R at the crossing portion P is, along the radial direction from the axis line CL of the shaft 61, at the position substantially the same as the inlet 3a of the rotor blade or further out than the inlet 3a of the rotor blade (by a length of L6), whereby the gap α having a constant width is formed to the inlet 3a of the rotor blade.

By employing such a structure, the width L1 (on the turbine housing side) of the flow path 27 in the inlet portion of the rotor blade is narrower than the width L2 (after removal of the portion hatched with dots) of a conventional flow path in the inlet portion of the rotor blade, whereby the cross-sectional area of the flow of the exhaust gas in the flow path 27 becomes small.

Figure 4:
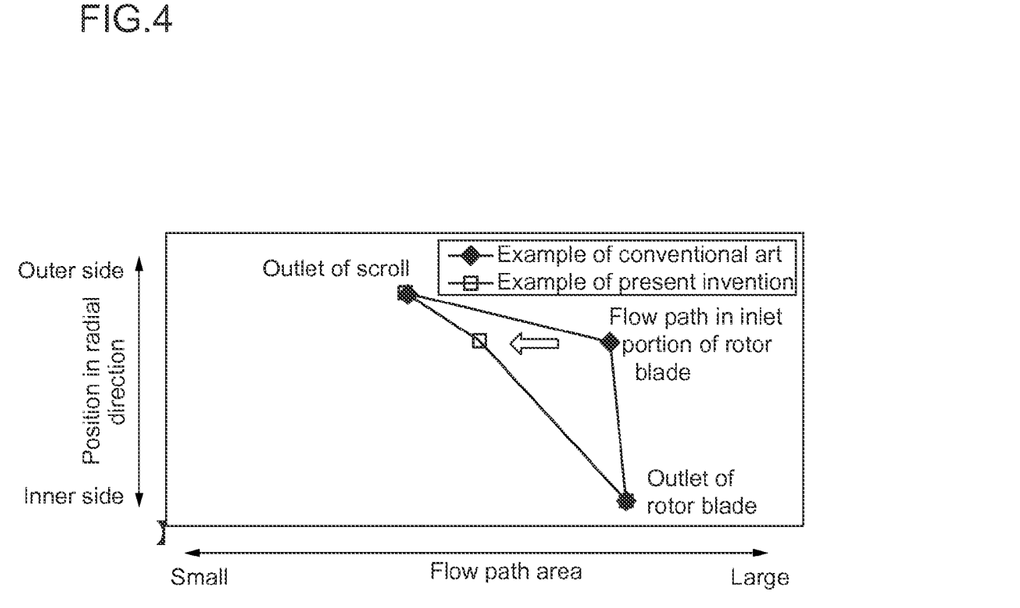
FIG. 4 is a chart showing states of a change in cross-sectional area of the flow path in FIGS. 3(A) and (B).

The dotted area Q within the width L1 of the flow path 27 in the inlet portion of the rotor blade is a portion which is improved in the present invention relative to a conventional shape. FIG. 4 is a chart showing a comparison of cross-sectional areas of respective flow paths between the shape according to the present invention and a shape according to a conventional art. According to a conventional art, the cross-sectional area of the flow path 27 in the inlet portion of the rotor blade is similar to the cross-sectional area of the outlet 3b of the rotor blade.

On the other hand, according to the present invention, the cross-sectional area increases substantially in a linear manner through the positions from the outlet of a scroll, via the flow path in the inlet portion of the rotor blade, to the outlet of the rotor blade.

Figure 6A:
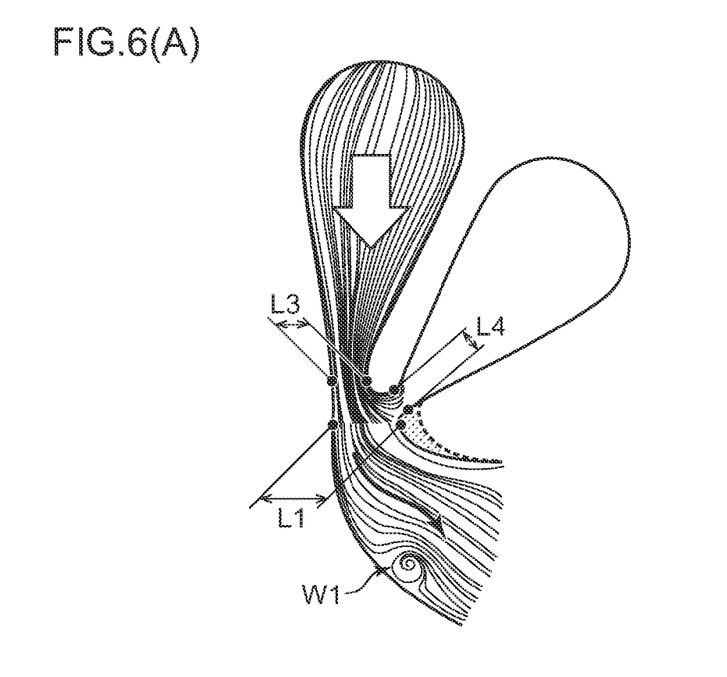
FIGS. 6(A) and (B) are charts showing flowing states of exhaust gas in the present invention and a conventional art by comparison.
Figure 6B:
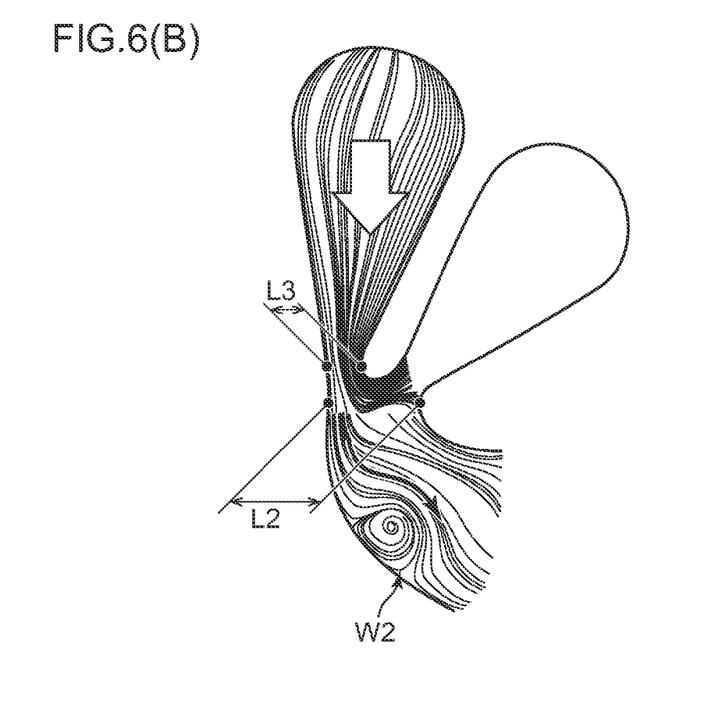

FIGS. 6(A) and (B) are charts showing analysis of exhaust gas flow in this embodiment and in a shape of a conventional art (a shape after removal of the dotted area in FIG. 3(A)), respectively.

The analysis was performed on the rear scroll side where the length from the outlet of the scroll 22a to the flow path 27 in the inlet portion of the rotor blade is long (range of expansion of the exhaust gas is large).

The analysis shown in FIG. 6(A), is performed within a range of the ratio of the width L1 of the flow path 27 in the inlet portion of the rotor blade to the width L3 of the outlet 22a of the rear scroll of from 1.2 to 1.4, and the analysis shown in FIG. 6(B) is performed under a condition such that the ratio of the width L2 of the conventional flow path in the inlet portion of the rotor blade to the width L3 of the outlet 22a of the rear scroll is 1.8 [width L2 (conventional)>width L1 (an embodiment of the present invention)].

The ratio of the width L1 of the flow path 27 in the inlet portion of the rotor blade to the width L4 of the outlet 21a of the front scroll is also within a range of from 1.2 to 1.4.

The chart of FIG. 6(A) in the case of the present invention shows that a vortex W1 of the exhaust gas is small within the rotor blade 3 (between a rotor blade and a rotor blade), which indicates that the flow resistance of the exhaust gas is small.

On the other hand, the chart of FIG. 6(B) shows that a vortex W2 of the exhaust gas within the rotor blade 3 is larger than in FIG. 6(A), which indicates that the flow resistance of the exhaust gas is larger.

In the case of the present invention, the space between the outlets of the respective scrolls and the inlet of the rotor blade is small, whereby expansion of the exhaust gas is suppressed, generation of flow with a vortex within the rotor blade 3 is suppressed, and the flow resistance of the exhaust gas within the rotor blade 3 is reduced, and the rotating force of the exhaust gas turbine 4 is thereby improved, and the turbocharging efficiency of the turbocharger is improved.

Second Embodiment

This embodiment is related to shapes of an outlet portion of a scroll and the flow path 27 in the inlet portion of the rotor blade. In the description of the second embodiment, the same elements as those of the first embodiment are assigned with the same reference numerals as those of the first embodiment, and the same description thereof will be omitted.

Figure 5:
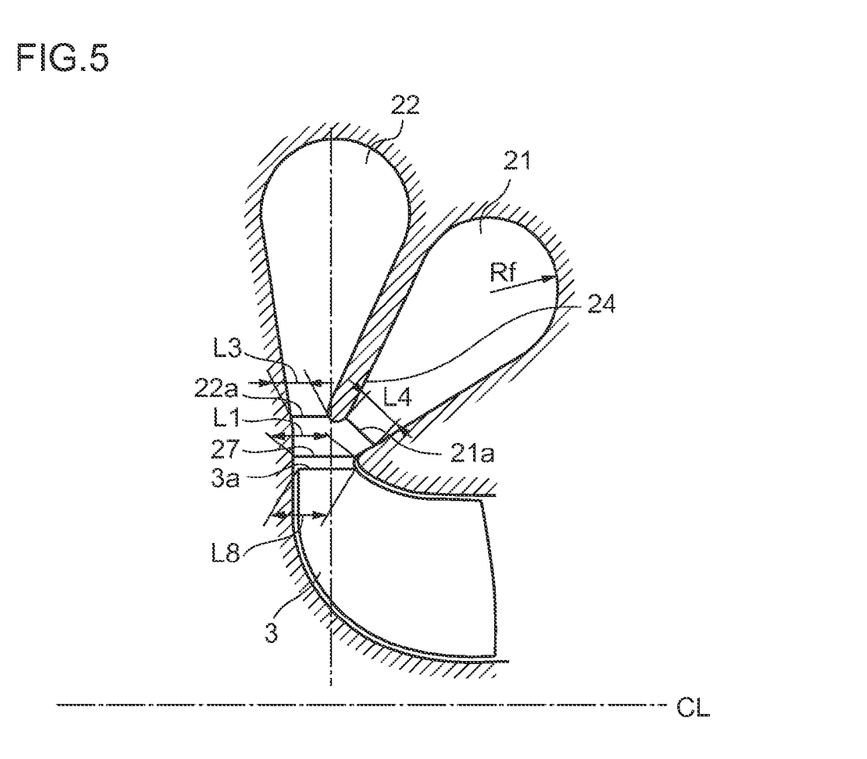
FIG. 5 is a view illustrating a shape of a flow path in an inlet portion of a rotor blade according to a second embodiment of the present invention.

In the second embodiment, the ratio γ of the width L1 (width along the axial direction) of the flow path 27 in the inlet portion of the rotor blade to the width L3 of the outlet 22a of the rear scroll (or the width L4 of the outlet 21a of the front scroll) is set to be within a range of from 1.2 to 1.4.

When the ratio γ is 1.2, with respect to the axis line CL of the shaft 61, the ratio of the area of the flow path 27 in the inlet portion of the rotor blade to the area of the outlet portion 22a of the rear scroll becomes about 1 due to the difference in the circumferential length associated with the difference between the radius Rin of the flow path 27 in the inlet portion of the rotor blade (the width L1 along the direction of CL) and the radius Rout of the outlet 22a of the rear scroll (the width L3 along the direction of CL).

If the ratio γ is less than 1.2, the area of the flow path 27 in the inlet portion of the rotor blade becomes smaller than the area of the outlet 22a of the scroll, and thus the flow rate of the flow of the exhaust gas may be increased until it comes to the inlet 3a of the rotor blade, and then the area may be rapidly expanded until it comes to the outlet within the rotor blade to arise turbulence. Since turbulence of a flow of exhaust gas may increase a loss, the turbocharging efficiency may be decreased. Accordingly, the ratio is preferably from 1.2 to 1.4.

As shown in the chart of FIG. 4, the flow path area of the flow path 27 in the inlet portion of the rotor blade is permitted to be close to the flow path area of the outlet of the scroll, whereby rapid expansion of the flow path cross-sectional area can be prevented, and turbulence of the exhaust gas within the rotor blade 3 can be suppressed.

As a result, the space between the outlets 21a, 22a of the respective scrolls and the inlet 3a of the rotor blade becomes small, whereby it is possible to suppress expansion of the exhaust gas and to suppress generation of a flow with a vortex within the rotor blade 3, thereby to reduce the flow resistance of the exhaust gas within the rotor blade 3, to improve the rotating force of the exhaust gas turbine 4, and thereby to improve the turbocharging efficiency of the turbocharger.

According to this embodiment, the ratio of the width of the flow path 27 in the inlet portion of the rotor blade to the width of the outlet 22a of the rear scroll (or the outlet 21a of the front scroll) is set to be small, whereby it is possible to suppress a rapid expansion of the exhaust gas flow to suppress the flow resistance of the exhaust gas flowing within the rotor blade 3 (between a rotor blade and a rotor blade), thereby to improve the turbocharging efficiency of the turbocharger.

INDUSTRIAL APPLICABILITY

The present invention is applicable to turbochargers which is driven by exhaust gas of an engine to improve the turbocharging efficiency.

The invention claimed is:

1. A twin-scroll turbocharger configured to be driven by exhaust gas of an engine, comprising:
   a turbine housing of a turbocharger,
   two exhaust gas introducing passages comprising a front scroll and a rear scroll, each of which is formed in the turbine housing along an axis line of a rotatable shaft of the turbocharger,
   a separation wall configured to separate the rear scroll and the front scroll, and
   a rotor blade mounted to the rotatable shaft and configured to rotate the rotatable shaft by exhaust gas, wherein
   the rear scroll is disposed so that a center line on a cross-sectional surface along a radial direction is substantially perpendicular to the axis line,
   the front scroll is disposed so that a center line on a cross-sectional surface along a radial direction has a gradient toward a side of an outlet of the rotor blade with respect to the axis line,
   an extended line of an inclined surface of the front scroll on a side of the housing and an inlet of the rotor blade intersect at a position in a central portion of the inlet of the rotor blade, and
   the front scroll has an outlet portion formed so that a crossing portion at which the inner periphery surface of the turbine housing, having a gap of a constant width between the inner periphery surface and an outer circumferential portion of the rotor blade, and the extended line of the inclined surface intersect is at a position within a width of the inlet of the rotor blade and further away from the axis in a radial direction than the inlet of the rotor blade, and
   wherein an area of a flow path in an inlet portion of the rotor blade is expanded relative to an area of an outlet of one of the rear scroll or the front scroll, and an area of the outlet of the rotor blade is expanded relative to the area of the flow path in the inlet portion of the rotor blade, and wherein an area expansion rate of the area of the flow path in the inlet portion of the rotor blade to the area of an outlet of one of the rear scroll or the front scroll and an area expansion rate of the area of the outlet of the rotor blade to the area of the flow path in the inlet portion of the rotor blade are substantially the same.

2. The twin-scroll turbocharger according to claim 1, wherein a ratio of a width, in a direction of the rotational axis, of the flow path in the inlet portion of the rotor blade to a width, in the direction of the rotational axis, of the outlet of one of the rear scroll or the front scroll is from 1.2 to 1.4.

3. The twin-scroll turbocharger according to claim 2, wherein a connecting portion where the inner periphery surface of the turbine housing and the inclined surface are connected is formed in an arc-like shape, and the center of the arc-like shape is, in the radial direction, on the same position as the inlet of the rotor blade or on a position farther than the inlet of the rotor blade from the axis line of the rotatable shaft.

4. The twin-scroll turbocharger according to claim 1, wherein a connecting portion where the inner periphery surface of the turbine housing and the inclined surface are connected is formed in an arc-like shape, and the center of the arc-like shape is, in the radial direction, on the same position as the inlet of the rotor blade or on a position farther than the inlet of the rotor blade from the axis line of the rotatable shaft.

* * * * *